(12) United States Patent
Smith et al.

(10) Patent No.: US 9,341,292 B2
(45) Date of Patent: May 17, 2016

(54) INSIDE CORNER PULL ELBOW FITTING

(71) Applicant: Bridgeport Fittings, Inc., Stratford, CT (US)

(72) Inventors: Lawrence J. Smith, Stamford, CT (US); Delbert Auray, Fairfield, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 16 days.

(21) Appl. No.: 14/471,290

(22) Filed: Aug. 28, 2014

(65) Prior Publication Data

US 2016/0061367 A1    Mar. 3, 2016

(51) Int. Cl.
| F16L 25/00 | (2006.01) |
| F16L 21/08 | (2006.01) |
| F16L 25/08 | (2006.01) |
| F16L 15/00 | (2006.01) |

(52) U.S. Cl.
CPC ............... *F16L 25/00* (2013.01); *F16L 15/00* (2013.01); *F16L 21/08* (2013.01); *F16L 25/08* (2013.01)

(58) Field of Classification Search
CPC ............................... F16L 21/022; F16L 25/12
USPC .................. 174/21 R, 650; 285/16, 179, 331
See application file for complete search history.

(56) References Cited

U.S. PATENT DOCUMENTS

| 1,669,447 A | 5/1928 | Boyton et al. |
| 1,887,192 A | 11/1932 | Betts, Jr. |
| 1,914,011 A | 6/1933 | Eccles |
| 2,955,851 A | 10/1960 | Scott |
| 3,074,459 A | 1/1963 | Pavia |
| 4,423,284 A | 12/1983 | Kaplan |
| 4,508,371 A | 4/1985 | Maier |
| 4,796,865 A | 1/1989 | Marchetti |
| 4,865,353 A * | 9/1989 | Osborne ................. F16L 57/06 285/148.22 |
| 4,867,334 A | 9/1989 | Robertson et al. |
| 5,016,924 A | 5/1991 | Lin |
| 5,161,580 A | 11/1992 | Klug |
| D334,380 S | 3/1993 | Henneberger |
| 5,316,243 A | 5/1994 | Henneberger |
| 5,469,893 A | 11/1995 | Caveney et al. |
| 5,533,763 A | 7/1996 | Neuhof |
| 5,917,982 A | 6/1999 | Vargas et al. |
| D413,306 S | 8/1999 | Scherer et al. |
| 5,995,699 A | 11/1999 | Vargas et al. |

(Continued)

FOREIGN PATENT DOCUMENTS

| GB | 2 243 027 A | 10/1991 |
| GB | 2325502 | * 11/1998 |

*Primary Examiner* — Chau N Nguyen
(74) *Attorney, Agent, or Firm* — Ware, Fressola, Maguire & Barber LLP

(57) ABSTRACT

An inside corner pull elbow fitting comprising a body having a first hub dimensioned for receipt of an electrical conduit, a second hub dimensioned for receipt of an electrical conduit, and an elbow portion positioned between said first and second hubs. The elbow portion has a wall defining a hollow interior that extends between the hubs, each end of the elbow portion having extension, the elbow portion including a cutout region positioned between said first and second ends and in an inner curved region of the elbow portion, the cutout region having a perimeter defining an opening to the hollow interior of the elbow portion; and a cover having a surface substantially corresponding to the perimeter defining the opening of the elbow portion, the cover further having tabs depending from first and second ends of the cover, the tabs dimensioned to be resiliently secured to the extensions.

23 Claims, 7 Drawing Sheets

(56) References Cited

U.S. PATENT DOCUMENTS

| | | |
|---|---|---|
| 6,496,642 B2 | 12/2002 | Gonzalez et al. |
| 6,523,791 B2 | 2/2003 | Bernard et al. |
| 6,637,777 B2 | 10/2003 | Zimmerman et al. |
| 6,838,615 B2 | 1/2005 | Pyron |
| 6,885,805 B2 | 4/2005 | Asada |
| 7,223,925 B2 | 5/2007 | Ewer et al. |
| 7,226,022 B2 | 6/2007 | Bernard et al. |
| 7,332,675 B2 | 2/2008 | Galasso |
| 7,671,277 B2 | 3/2010 | Hill et al. |
| 8,513,559 B2 | 8/2013 | Brandstrom |
| D737,783 S * | 9/2015 | Smith .......................... D13/155 |
| 2005/0241846 A1 | 11/2005 | Finn, III et al. |

* cited by examiner

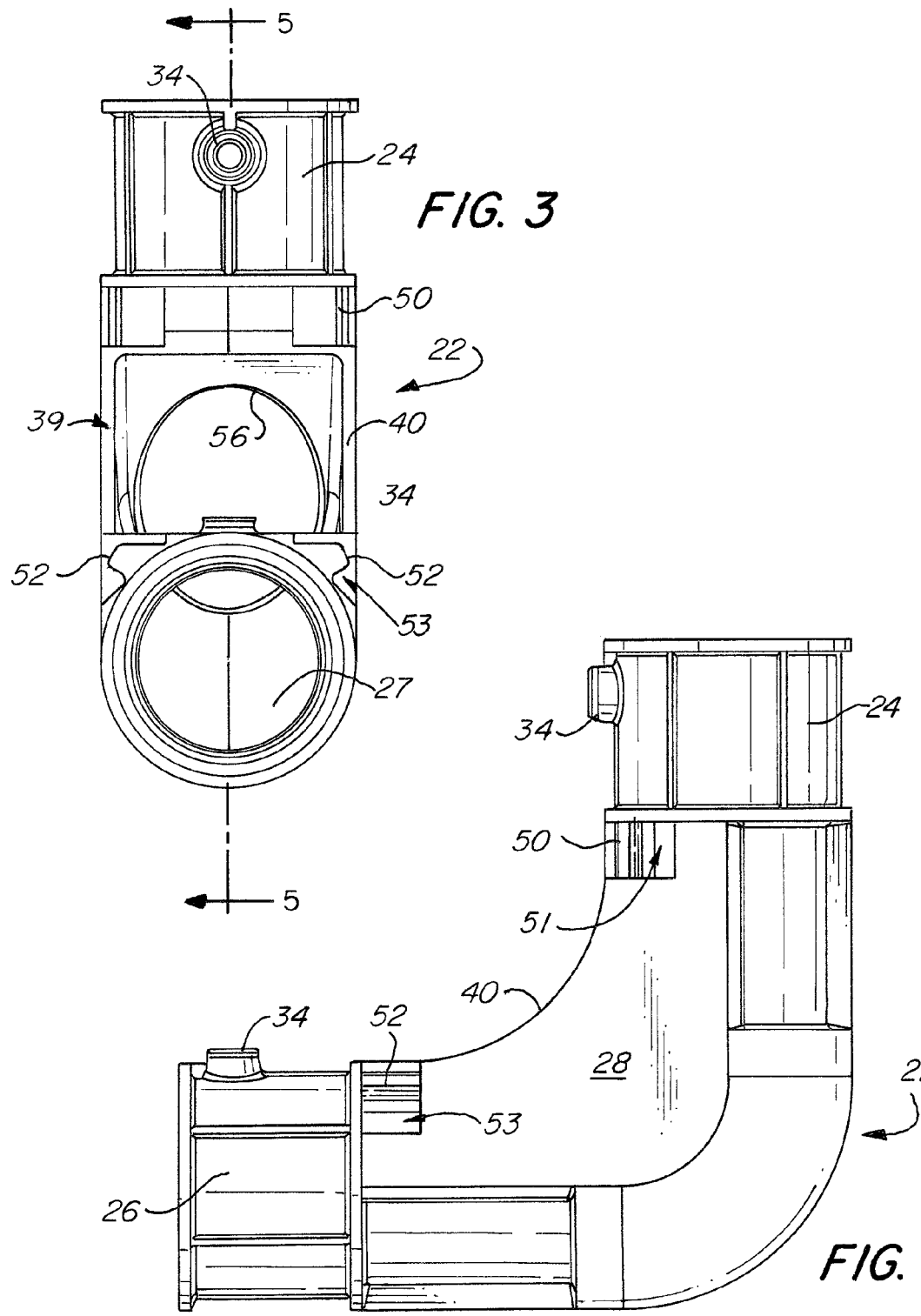

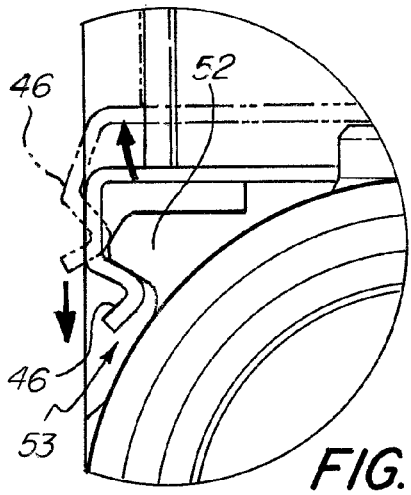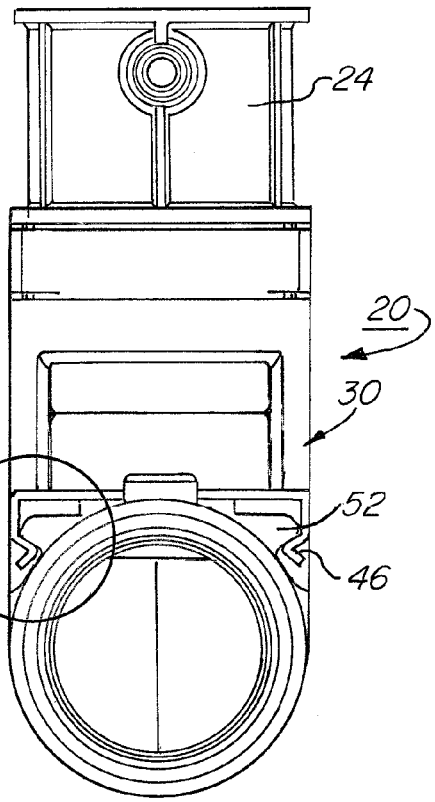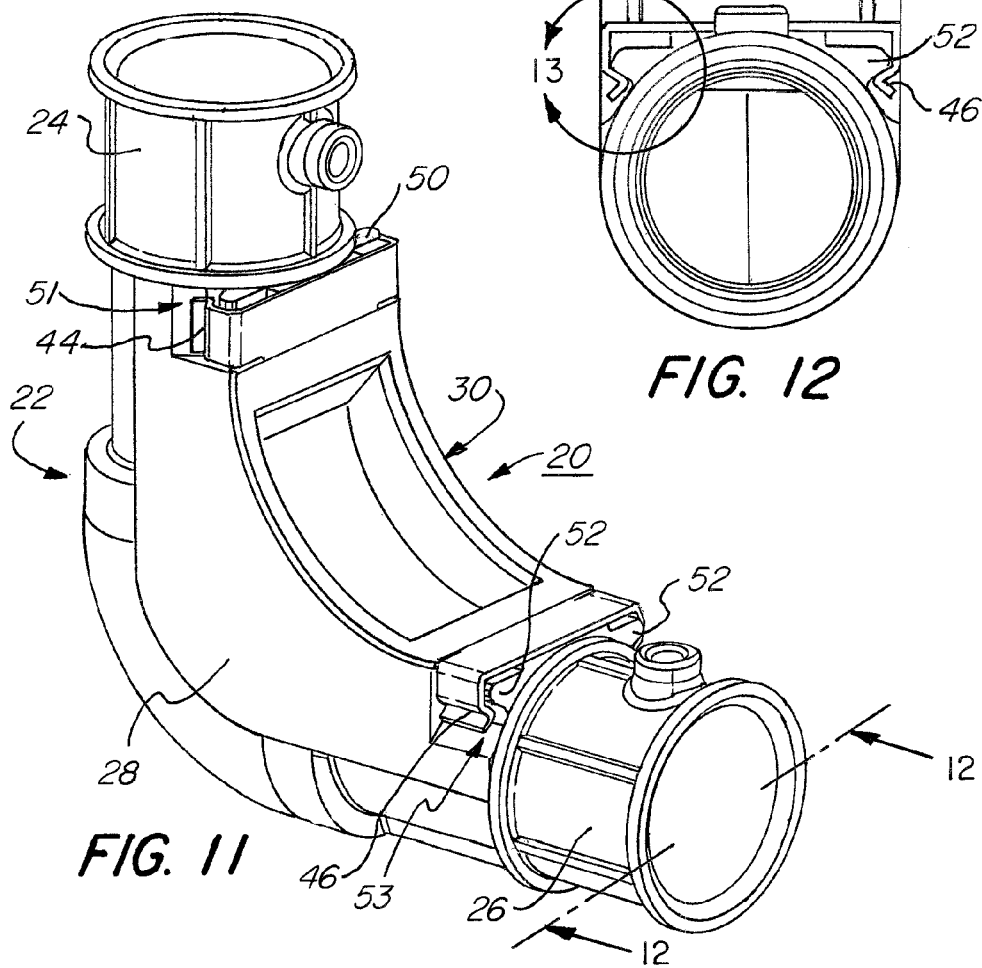
FIG. 13
FIG. 12
FIG. 11

INSIDE CORNER PULL ELBOW FITTING

TECHNICAL FIELD

The present invention relates to conduit fittings and in particular to pull elbow fittings, sometimes called pull elbows.

BACKGROUND OF THE INVENTION

In the electrical fitting art there is the need for what are typically called pull (pulling) elbows or pull elbow fittings that allow for two pieces of conduit to be connected typically at right angles to each other and to allow electrical wiring to pass therethrough.

Prior art devices such as that disclosed in U.S. Pat. No. 2,955,851 disclose a pulling elbow having an opening which is positioned away from the hubs of the housing. Although this allows for access to the interior space of the body of the pulling elbow, it does so in a region which is not easy to reach once the pulling elbow is positioned in place, especially if it is positioned against a flat surface. In particular, such pulling elbows present a significant impediment to access into the pulling elbow if the elbow is positioned against a flat surface adjacent that of the cover.

SUMMARY OF THE INVENTION

The present invention provides an improvement to the state-of-the-art of pulling elbows and similar electrical fittings by providing an inside corner pull elbow fitting with access to the interior of the body of the fitting even after the fitting is positioned against one or more wall surfaces or next to itself.

The present invention relates to an inside corner pull elbow fitting comprising a body having a first hub with a hollow passageway therethrough, the first hub dimensioned for receipt of an electrical conduit, a second hub with a hollow passageway therethrough, the second hub dimensioned for receipt of an electrical conduit, and an elbow portion having first and second ends, the elbow portion positioned between said first and second hubs, the elbow portion having at least one wall defining a hollow interior that extends between the hubs, each end of the elbow portion having extensions positioned thereon, the elbow portion including a cutout region positioned between said first and second ends and in an inner curved region of the elbow portion, the cutout region having a perimeter defining an opening to the hollow interior of the elbow portion, and a cover having a surface substantially corresponding to the perimeter defining the opening of the elbow portion, the cover further having tabs depending from first and second ends of the cover, the tabs dimensioned to be resiliently secured to the extensions.

Another embodiment of the present invention is the inside corner pull elbow fitting as described above, wherein the cutout region of the elbow portion of the body is sized to allow a user to retrieve an item passing through the hollow interior of the elbow portion.

A further embodiment of the present invention is the inside corner pull elbow fitting as described above, wherein the cutout region of the elbow portion of the body spans the hollow interior of said elbow portion.

A still further embodiment of the present invention is the inside corner pull elbow fitting as described above, wherein each end of the elbow portion has slots formed therein, wherein the tabs of the cover extend into said slots when the cover is secured to the elbow portion.

Another embodiment of the present invention is the inside corner pull elbow fitting as described above, wherein the elbow portion includes oval shaped openings on both ends of said hollow interior.

Another embodiment of the present invention is the inside corner pull elbow fitting as described above, wherein each hub includes a nipple with a threaded region that extends through the hub, the threaded region dimensioned for receipt of a set screw to assist in securing an electrical conduit to the hub.

A further embodiment of the present invention is the inside corner pull elbow fitting as described above, wherein each hub has an interior threaded portion for receipt of an electrical conduit with an externally threaded end.

A still further embodiment of the present invention is the inside corner pull elbow fitting as described above, wherein the hubs are integrally secured to the elbow portion.

Another embodiment of the present invention is the inside corner pull elbow fitting as described above, wherein the elbow fitting is fabricated from die cast zinc alloy, malleable iron or cast aluminum.

A further embodiment of the present invention is the inside corner pull elbow fitting as described above, wherein the cover is formed from stamped spring steel.

A still further embodiment of the present invention is the inside corner pull elbow fitting as described above, wherein the cover is zinc plated or aluminum plated.

Another embodiment of the present invention is the inside corner pull elbow fitting as described above, wherein the elbow fitting is fabricated from die cast zinc alloy, malleable iron or cast aluminum.

Another embodiment of the present invention is the inside corner pull elbow fitting as described above, wherein the cover is formed from stamped spring steel.

A further embodiment of the present invention is the inside corner pull elbow fitting as described above, wherein the cover is zinc plated or aluminum plated.

Another embodiment of the present invention is the inside corner pull elbow fitting as described above comprising a body having a first hub with a hollow passageway therethrough, the first hub dimensioned for receipt of an electrical conduit, a second hub with a hollow passageway therethrough, the second hub dimensioned for receipt of an electrical conduit, and an elbow portion having first and second ends, the elbow portion positioned between said first and second hubs, the elbow portion having at least one wall defining a hollow interior that extends between the hubs, the elbow portion including a cutout region positioned between said first and second ends and in an inner curved region of the elbow portion, the cutout region having a perimeter defining an opening to the hollow interior of the elbow portion, and a cover having a surface substantially corresponding to the perimeter defining the opening of the elbow portion, the cover further having means for resilient securement to the elbow portion.

A further embodiment of the present invention is the inside corner pull elbow fitting as described above, wherein each end of the elbow portion has extensions and wherein the means for resilient securement of the cover to the elbow portion are secured to said extensions.

Another embodiment of the present invention is the inside corner pull elbow fitting as described above, wherein the means for resilient securement of the cover to the elbow portion comprises tabs depending from first and second ends of the cover.

A further embodiment of the present invention is the inside corner pull elbow fitting as described above, wherein each end of the elbow portion has slots formed therein and wherein the means for resilient securement of the cover to the elbow portion are resiliently secured to said slots.

A still further embodiment of the present invention is the inside corner pull elbow fitting as described above, wherein the cutout region of the elbow portion of the body is sized to allow a user to retrieve an item passing through the hollow interior of the elbow portion.

BRIEF DESCRIPTION OF THE DRAWINGS

For a further understanding of the nature and features of the present invention, reference is made to the following detailed description taken in conjunction with the following drawings and which:

FIG. 3 is a front view of the elbow fitting taken in the general direction of line 3-3 as show in FIG. 1.

FIG. 4 is a right side of the elbow fitting relative to the perspective view shown in FIG. 1.

FIG. 11 is a perspective view of the elbow fitting as shown in FIG. 1, with the cover positioned on the body of the elbow fitting.

FIG. 12 is an end view of the elbow fitting in the general direction of arrows 12-12 as shown in FIG. 11.

FIG. 13 is an enlarged view of a portion of the elbow fitting taken along circular line 13 shown in FIG. 12, including the tabs of the cover positioned about the body of the elbow fitting.

DETAILED DESCRIPTION

Figure 2:
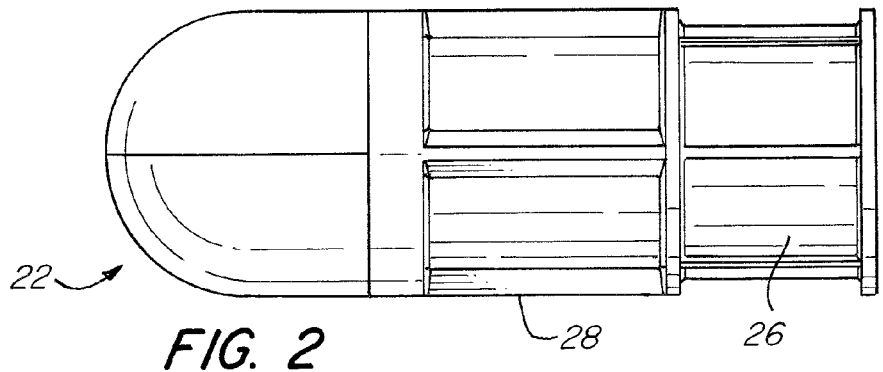
FIG. 2 is a bottom view of the elbow fitting as shown in FIG. 1.
Figure 1:
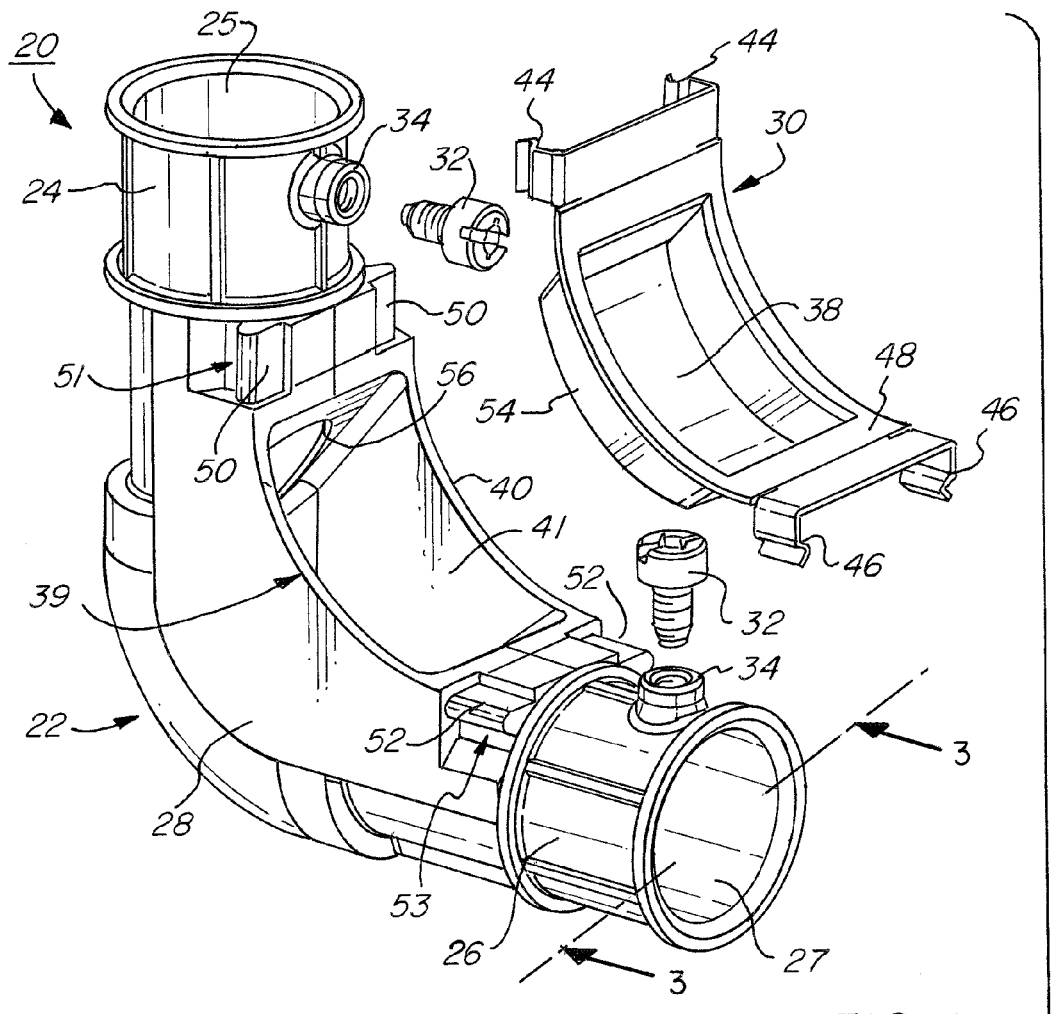
FIG. 1 is an exploded perspective view of an embodiment of an inside corner pull elbow fitting according to the present invention.

As best seen in FIG. 1, an embodiment of an inside corner pull elbow fitting 20 according to the present invention has a body 22 having a first hub 24, a second hub 26 and an elbow portion 28. The elbow fitting further includes a cover 30. Machine screws 32 threadedly engage with nipples 34 so as to secure electrical conduit 36 to the elbow fitting 20 as best seen in FIG. 14.

Figure 5:
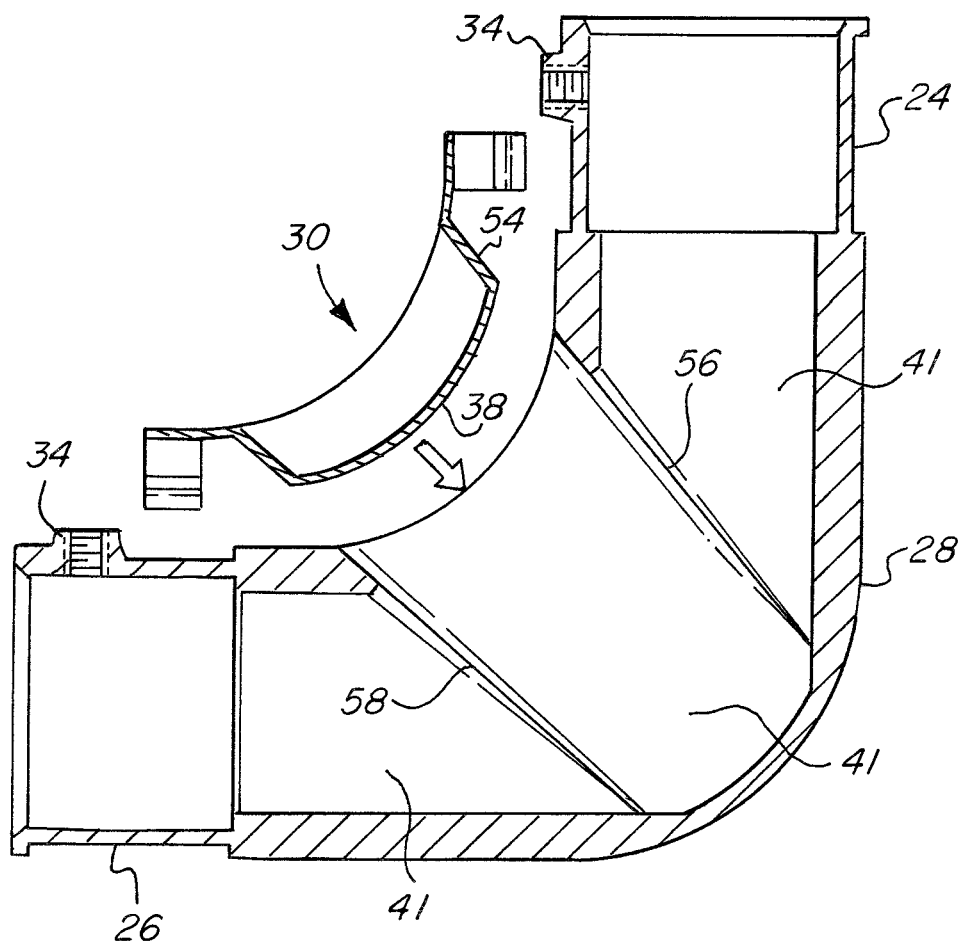
FIG. 5 is a cross-sectional view of the elbow fitting taken along line 5-5 of FIG. 3.
Figure 8:
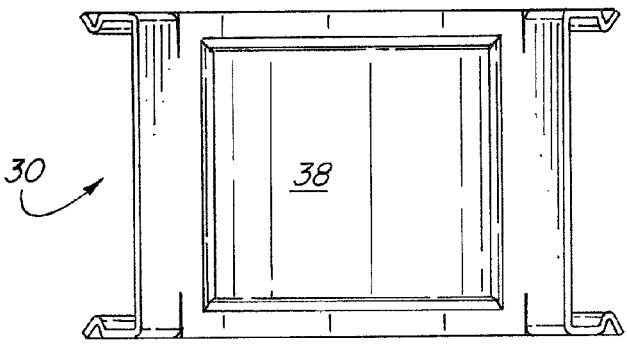
FIG. 8 is a top view of the cover shown in FIG. 6.
Figure 10:
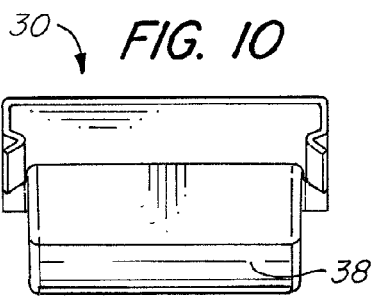
FIG. 10 is an end view of the cover shown in FIG. 6.
Figure 9:
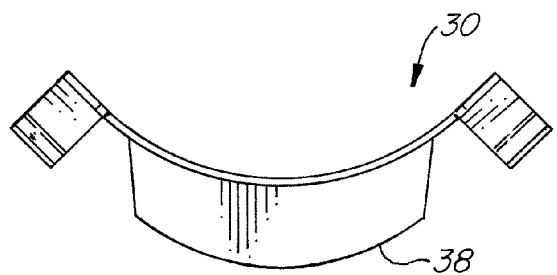
FIG. 9 is a side view of the cover shown in FIG. 6.
Figure 6:
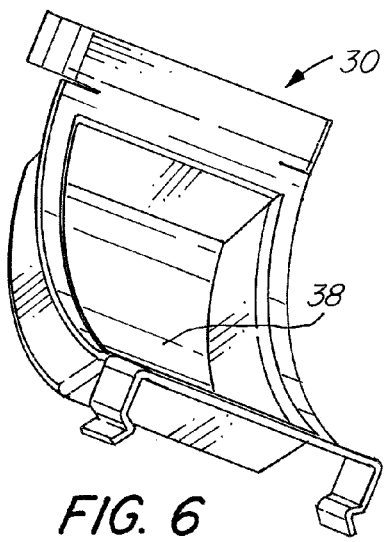
FIG. 6 is a perspective view of the cover for the embodiment of the elbow fitting shown in FIG. 1.
Figure 7:
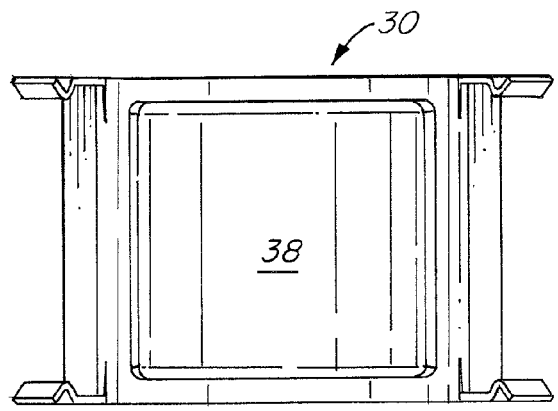
FIG. 7 is a bottom view of the cover shown in FIG. 6.
Figure 14:
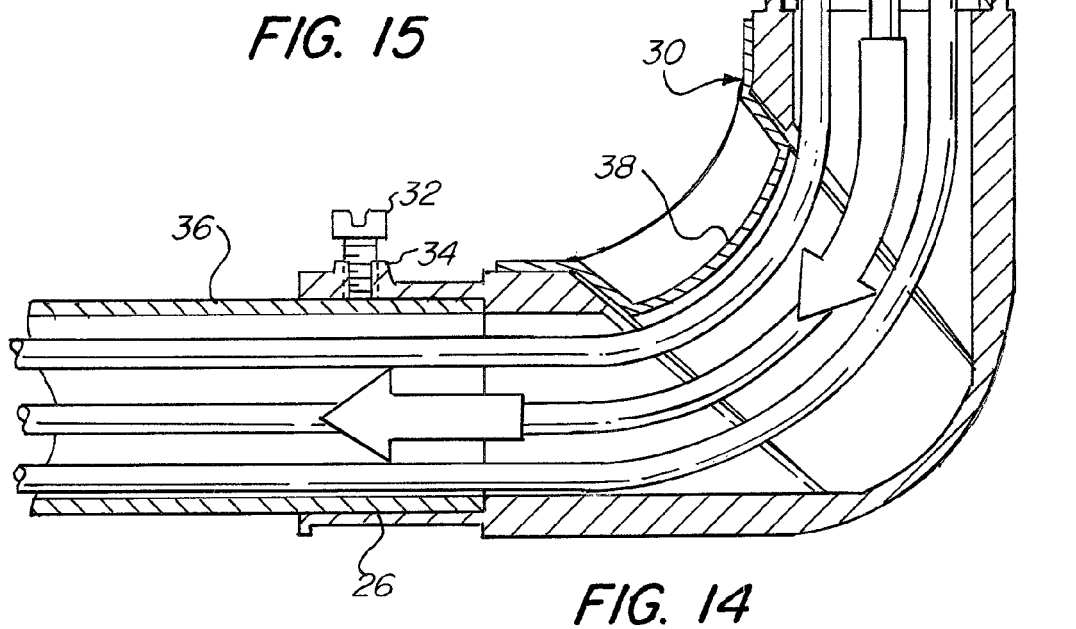
FIG. 14 is a cross-sectional view of the elbow fitting showing conduits attached at each end thereof and illustrating the passage of electrical conductors therethrough.

As seen in FIGS. 1, 5 and 14, cover 30 includes a surface 38 which, when the cover is positioned within a cutout region 40 of body 22, provides a smooth surface to electrical conductors 42 passing through the elbow fitting. Cover 30 includes tabs 44 and 46 that depend from perimeter 48 of the cover. These tabs are positioned at first and second ends of the cover as best seen in FIG. 1. The tabs are dimensioned to contact extensions 50 and 52 positioned at first and second ends of the body 22 so as to extend within slots 51 and 53. FIG. 1 shows the cover away from the body while FIG. 11 shows the cover attached to the elbow portion of the body in slots 51 and 53.

The extensions can have different shapes from those shown in the figures provided that the cover tabs are able to resiliently contact the extensions and/or to be resiliently secured in slots formed within the elbow portion.

FIGS. 12 and 13 show details of the resilient attachment of tabs 44 and 46 to the extensions 50 and 52 of the elbow portion. FIG. 13 shows in phantom the tab as it presses up against extension 50 prior to snap engagement with the extension in slot 51 where the tab is shown in FIG. 13 in solid form. This arrangement of the tabs and the extensions on the elbow portion of the body provide an easy mechanism for attaching and removing the cover from the elbow fitting without the use of tools.

The cover also includes sidewalls 54 for positioning surface 30 below the periphery 48 of the cover so as to position surface 38 in a region near the interior surface of the elbow portion as best seen in FIG. 14.

The details of body 22, first hub 24 and second hub 26 is seen with reference to FIGS. 1-5. In particular, the first and second hubs in the embodiment shown are dimensioned for receipt of electrical conduit 36 as shown in FIG. 14. Thus, first and second hubs 24 are cylindrical in shape each having a passageway 25 and 27 respectively dimensioned for receipt of an electrical conduit, again as shown in FIG. 14. Each hub includes a threaded nipple 34 dimensioned for receipt of a set screw 32 so as to secure an electrical conduit to the hub as best seen in FIG. 14.

Figure 15:
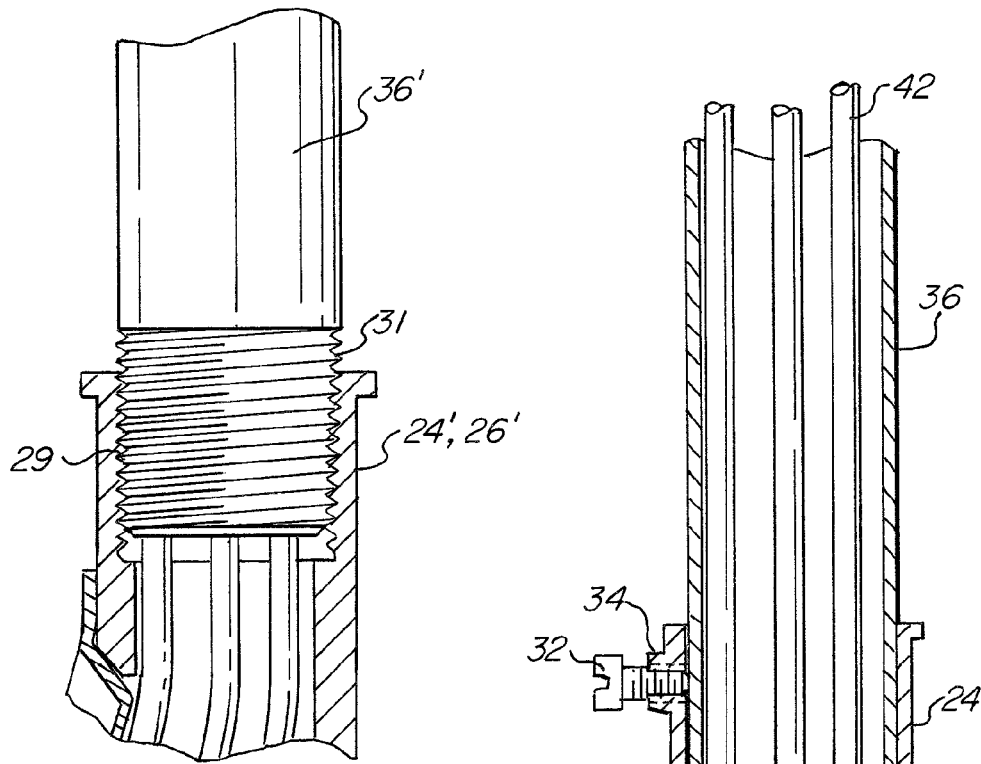
FIG. 15 is a partial cross-sectional view of an alternative embodiment of the elbow fitting wherein the elbow fitting hub(s) has interior threads for mating with a threaded electrical conduit.

FIG. 15 shows that either hub 24', 26' may have interior threads 29 for receipt of an electrical conduit 36' having exterior threads 31 formed thereon.

Elbow portion 28 is positioned between the first and second hubs 24 and 26 with the hubs either attached thereto or integrally formed therewith. Elbow portion 28 has a hollow interior 41 which extends between passageways 25 and 27 of first and second hubs 24 and 26. The elbow portion includes an inner curved region 39 where cutout region 40 is located.

As seen in FIGS. 1, 3, 4 and 5, the elbow portion is dimensioned so that the hollow interior includes oval openings 56 and 58 so as to facilitate the passage of electrical conductors 36 through the elbow fitting 20 as illustrated in FIG. 14. It is noted that when cover 30 is positioned on the elbow portion, the surface 38 of the cover extends inside recess 41 to an extend commensurate with the oval openings 56 and 58. This provides a smooth surface for electrical conductors to contact when the conductors are pulled through the elbow fitting.

Figure 16:
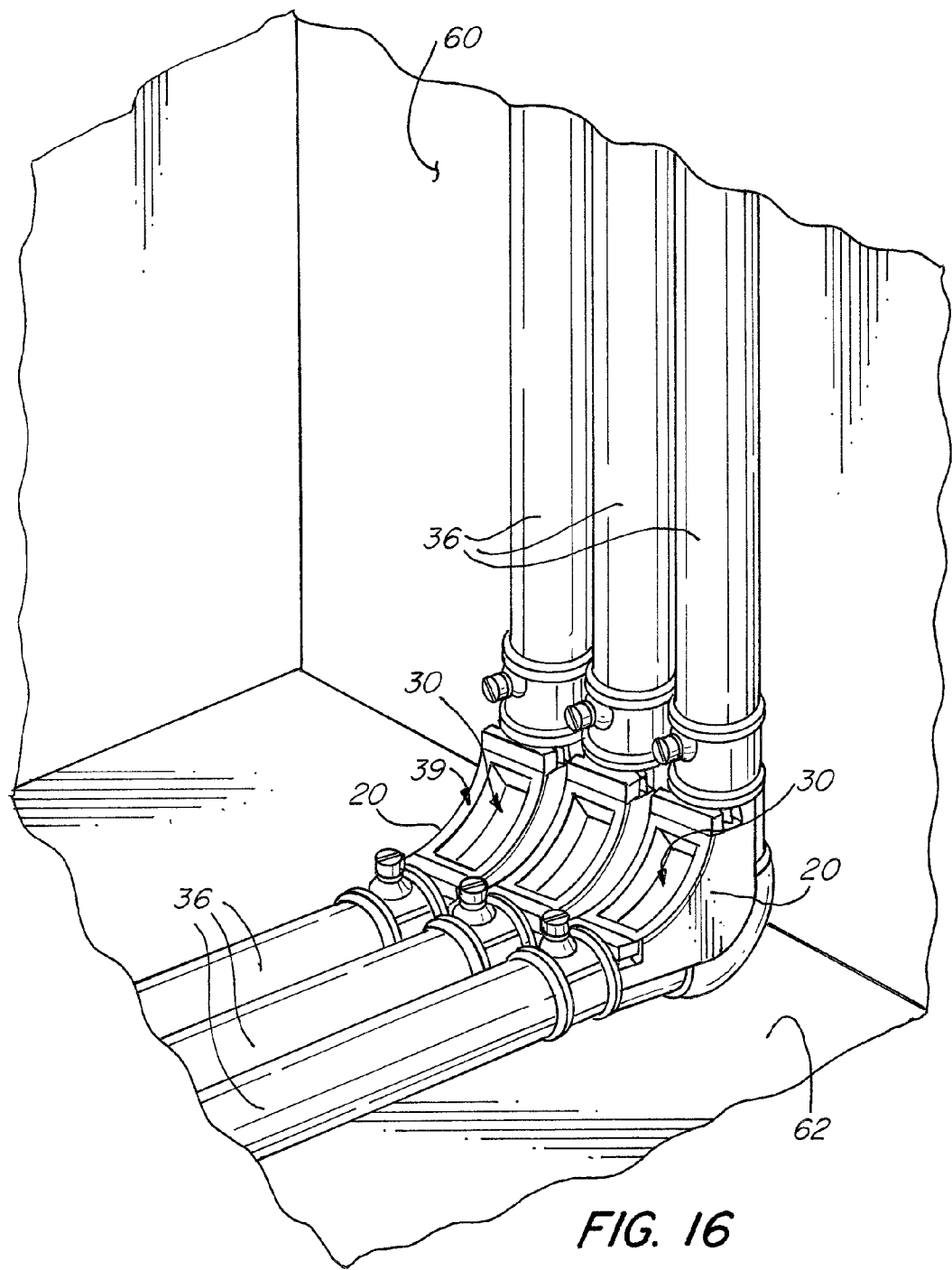
FIG. 16 is a perspective view of a typical installation with multiple elbow fittings installed next to each other in a side-to-side (stacked) relationship.

In operation, the inside corner pull elbow fitting is connected to a first electrical conduit with conductors passed through the electrical conduit into the elbow fitting. The cover is generally left on the elbow fitting although it can easily be removed to provide access to inside the elbow fitting, if required, but generally this operation is not required. Fish tape or other conductor pulling assisting devices can be used to pull the conductors through the elbow fitting and the attached conduits. FIG. 16 shows that the elbow fitting can be positioned against multiple surfaces, such as a wall 60 or floor 62 and the elbow fittings 20 can be installed (stacked) next to each other in a side-by-side relationship since the covers associated with each elbow fitting are on the inside curved region 39 (corner) of the elbow fitting, rather than on the outside corner or side portion of the elbow fitting as found in prior art devices. As seen in FIG. 5, the hollow interior of the elbow fitting has an interior radius which is particularly advantageous for pulling electrical conductors therethrough as seen in FIG. 14 since the overall radius is not abrupt or sharp which could potentially pinch or otherwise damage the electrical conductors as they are pulled through the elbow fitting. Therefore, there is no need for electrical conductors to be pulled out of the cutout region 40 of the elbow portion and then to reinsert them into the elbow fitting so as to exit the hub opposite that from which the electrical conductors entered the elbow fitting. Such a need for pulling conductors out of an elbow fitting is typically found on prior art devices, especially those with sharp interior radii.

Thus, the inside corner pull electrical fitting according to the present invention solves a dilemma found in many electrical installation applications as described above since the design of the elbow fitting according to the embodiments of the present invention allows the electrical installer to easily fish the pull string or fish tape attached to the ends of the electrical conductors 36 through the elbow fitting and then, with the cover installed, pull the electrical conductor bundle through the 90° corner of the elbow fitting. The cover's design as described above allows for easy pulling of multiple solid and/or stranded conductors through the elbow fitting without damage caused by the fitting itself.

The body 22, first hub 24 and second hub 26 may preferably be fabricated from a die cast zinc alloy, a malleable iron or cast aluminum. Cover 30 is preferably formed from stamped spring steel which may be zinc plated or aluminum plated.

Thus, the elbow fitting according to the present invention is particularly advantageous in situations where there is tight mounting to surfaces is required since future access to the cover is permitted with the elbow fitting of the present invention. This arrangement makes the elbow fitting according to the present invention compliant with electrical standards, such as The National Electrical Code.

As described above, the cover easily snaps on and off of the elbow portion of the elbow fitting by easily snapping into and out of the slots associated with the tabs extending at each end of the elbow portion.

As shown in the embodiment of FIGS. 1-14, although nipples with associated set screws may be used for securing the electrical conduit to the elbow fitting, other attachment methods such as threaded hubs as shown in FIG. 15 can be used to attach to threaded conduit.

The overall benefits of the present invention is that it allows electrical conduits to make a compact 90° turn, such as from wall to ceiling, wall to wall, or wall to floor, while maintaining required access to the cover in the elbow fitting. Another advantage is that the cover according to the present invention is designed to facilitate electrical conductor pull by having a smooth radius associated with surface 38 throughout the entire region in which the conductors turn and thus the electrical installers can have the cover installed onto the elbow portion to assist in pulling the conductors through the elbow fitting.

The cover itself is easy to install and remove without requiring fasteners or special tools.

Furthermore, as noted above, the elbow fittings are stackable next to each other in a side-by-side relationship while still allowing access to the covers. The elbow fittings according to the present invention provide an attractive appearance and can be used to substitute for one pre-formed EMT/rigid elbow and two coupling fittings or a traditional junction box with two connector fittings.

The elbow fitting according to the present invention has a low profile and therefore fits nearly flush against surfaces without the need for offsets. Electrical conduits are easily attached thereto with either a set screw or threaded engagement.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An inside corner pull elbow fitting comprising:
    a body having
        a first hub with a hollow passageway therethrough, the first hub dimensioned for receipt of an electrical conduit,
        a second hub with a hollow passageway therethrough, the second hub dimensioned for receipt of an electrical conduit, and
        an elbow portion having first and second ends, the elbow portion positioned between said first and second hubs, the elbow portion having at least one wall defining a hollow interior that extends between the hubs, each end of the elbow portion having extensions positioned thereon, the elbow portion including a cutout region positioned between said first and second ends and in an inner curved region of the elbow portion, the cutout region having a perimeter defining an opening to the hollow interior of the elbow portion; and
    a cover having a surface substantially corresponding to the perimeter defining the opening of the elbow portion, the cover further having tabs depending from first and second ends of the cover, the tabs dimensioned to be resiliently secured to the extensions.

2. The inside corner pull elbow fitting according to claim 1, wherein the cutout region of the elbow portion of the body is sized to allow a user to retrieve an item passing through the hollow interior of the elbow portion.

3. The inside corner pull elbow fitting according to claim 2, wherein the cutout region of the elbow portion of the body spans the hollow interior of said elbow portion.

4. The inside corner pull elbow fitting according to claim 1, wherein each end of the elbow portion has slots formed therein, wherein the tabs of the cover extend into said slots when the cover is secured to the elbow portion.

5. The inside corner pull elbow fitting according to claim 1, wherein the elbow portion includes oval shaped openings on both ends of said hollow interior.

6. The inside corner pull elbow fitting according to claim 1, wherein each hub includes a nipple with a threaded region that extends through the hub, the threaded region dimensioned for receipt of a set screw to assist in securing an electrical conduit to the hub.

7. The inside corner pull elbow fitting according to claim 1, wherein each hub has an interior threaded portion for receipt of an electrical conduit with an externally threaded end.

8. The inside corner pull elbow fitting according to claim 1, wherein the hubs are integrally secured to the elbow portion.

9. The inside corner pull elbow fitting according to claim 8, wherein the elbow fitting is fabricated from die cast zinc alloy, malleable iron or cast aluminum.

10. The inside corner pull elbow fitting according to claim 9, wherein the cover is formed from stamped spring steel.

11. The inside corner pull elbow fitting according to claim 10, wherein the cover is zinc plated or aluminum plated.

12. The inside corner pull elbow fitting according to claim 1, wherein the elbow fitting is fabricated from die cast zinc alloy, malleable iron or cast aluminum.

13. The inside corner pull elbow fitting according to claim 12, wherein the cover is formed from stamped spring steel.

14. The inside corner pull elbow fitting according to claim 13, wherein the cover is zinc plated or aluminum plated.

15. An inside corner pull elbow fitting comprising:
a body having
a first hub with a hollow passageway therethrough, the first hub dimensioned for receipt of an electrical conduit,
a second hub with a hollow passageway therethrough, the second hub dimensioned for receipt of an electrical conduit, and
an elbow portion having first and second ends, the elbow portion positioned between said first and second hubs, the elbow portion having at least one wall defining a hollow interior that extends between the hubs, the elbow portion including a cutout region positioned between said first and second ends and in an inner curved region of the elbow portion, the cutout region having a perimeter defining an opening to the hollow interior of the elbow portion; and
a cover having a smooth surface coextensive with the inner curved region of the elbow portion, the cover substantially corresponding to the perimeter defining the opening of the elbow portion, the cover further having means for resilient securement to the elbow portion, whereby the cover provides said smooth surface for electrical conductors to contact when the conductors are pulled through the elbow fitting.

16. The inside corner pull elbow fitting according to claim 15, wherein each end of the elbow portion has extensions and wherein the means for resilient securement of the cover to the elbow portion are secured to said extensions.

17. The inside corner pull elbow fitting according to claim 16, wherein the means for resilient securement of the cover to the elbow portion comprises tabs depending from first and second ends of the cover.

18. The inside corner pull elbow fitting according to claim 15, wherein each end of the elbow portion has slots formed therein and wherein the means for resilient securement of the cover to the elbow portion are resiliently secured to said slots.

19. The inside corner pull elbow fitting according to claim 15, wherein the cutout region of the elbow portion of the body is sized to allow a user to retrieve an item passing through the hollow interior of the elbow portion.

20. The inside corner pull elbow fitting according to claim 15, wherein the cover includes sidewalls to support said smooth surface so that the smooth surface extends inside the hollow interior of the elbow portion so as to extend commensurate with oval opening formed in said hollow interior of the elbow portion.

21. An inside corner pull elbow fitting comprising:
a body having
a first hub with a hollow passageway therethrough, the first hub dimensioned for receipt of an electrical conduit,
a second hub with a hollow passageway therethrough, the second hub dimensioned for receipt of an electrical conduit, and
an elbow portion having first and second ends, the elbow portion positioned between said first and second hubs, the elbow portion having at least one wall defining a hollow interior that extends between the hubs, the elbow portion including a cutout region positioned between said first and second ends and in an inner curved region of the elbow portion, the cutout region having a perimeter defining an opening to the hollow interior of the elbow portion; and
a cover having a surface substantially corresponding to the perimeter defining the opening of the elbow portion, the cover further having means for resilient securement to the elbow portion,
wherein each end of the elbow portion has extensions and wherein the means for resilient securement of the cover to the elbow portion are secured to said extensions.

22. The inside corner pull elbow fitting according to claim 21, wherein the means for resilient securement of the cover to the elbow portion comprises tabs depending from first and second ends of the cover.

23. An inside corner pull elbow fitting comprising:
a body having
a first hub with a hollow passageway therethrough, the first hub dimensioned for receipt of an electrical conduit,
a second hub with a hollow passageway therethrough, the second hub dimensioned for receipt of an electrical conduit, and
an elbow portion having first and second ends, the elbow portion positioned between said first and second hubs, the elbow portion having at least one wall defining a hollow interior that extends between the hubs, the elbow portion including a cutout region positioned between said first and second ends and in an inner curved region of the elbow portion, the cutout region having a perimeter defining an opening to the hollow interior of the elbow portion; and
a cover having a surface substantially corresponding to the perimeter defining the opening of the elbow portion, the cover further having means for resilient securement to the elbow portion,
wherein each end of the elbow portion has slots formed therein and wherein the means for resilient securement of the cover to the elbow portion are resiliently secured to said slots.

* * * * *